US 9,180,890 B2
Nov. 10, 2015

(12) United States Patent
Lu et al.

(10) Patent No.: US 9,180,890 B2
(45) Date of Patent: Nov. 10, 2015

(54) SMART ADAPTIVE CRUISE CONTROL

(75) Inventors: Jianbo Lu, Livonia, MI (US); Kwaku O. Prakah-Asante, Commerce Township, MI (US); Dimitar Petrov Filev, Novi, MI (US)

(73) Assignee: Ford Global Technologies, Dearborn, MI (US)

( * ) Notice: Subject to any disclaimer, the term of this patent is extended or adjusted under 35 U.S.C. 154(b) by 223 days.

(21) Appl. No.: 13/405,512

(22) Filed: Feb. 27, 2012

(65) Prior Publication Data
US 2013/0226431 A1 Aug. 29, 2013

(51) Int. Cl.
*B60T 7/12* (2006.01)
*G05D 1/00* (2006.01)
*B60W 50/00* (2006.01)
*B60W 30/16* (2012.01)

(52) U.S. Cl.
CPC .......... *B60W 50/0098* (2013.01); *B60W 30/16* (2013.01); *B60W 2050/0077* (2013.01); *B60W 2050/0083* (2013.01); *B60W 2550/22* (2013.01); *B60W 2550/30* (2013.01); *B60W 2550/40* (2013.01); *B60W 2750/308* (2013.01)

(58) Field of Classification Search
CPC .......... B60W 30/16; B60W 2550/308; B60W 2550/302; B60K 31/0008; B60K 31/00
USPC .......................................................... 701/96
See application file for complete search history.

(56) References Cited

U.S. PATENT DOCUMENTS

| | | | |
|---|---|---|---|
| 6,067,031 A * | 5/2000 | Janky et al. | 340/903 |
| 6,268,804 B1 * | 7/2001 | Janky et al. | 340/903 |
| 6,275,231 B1 * | 8/2001 | Obradovich | 345/156 |
| 6,275,764 B1 * | 8/2001 | Sielagoski et al. | 701/93 |
| 6,703,944 B1 * | 3/2004 | Obradovich | 340/903 |
| 6,902,021 B2 | 6/2005 | Kikuchi et al. | |
| 2008/0059035 A1 * | 3/2008 | Siddiqui et al. | 701/93 |
| 2010/0228420 A1 * | 9/2010 | Lee | 701/26 |
| 2011/0106334 A1 * | 5/2011 | Filev et al. | 701/1 |
| 2011/0106381 A1 * | 5/2011 | Filev et al. | 701/40 |
| 2011/0172864 A1 * | 7/2011 | Syed et al. | 701/22 |

FOREIGN PATENT DOCUMENTS

| | | |
|---|---|---|
| EP | 1008482 A2 | 12/1999 |
| EP | 1741609 A2 | 6/2006 |

* cited by examiner

*Primary Examiner* — Behrang Badii
*Assistant Examiner* — Daniel L Greene
(74) *Attorney, Agent, or Firm* — Angela M. Brunetti; Frank MacKenzie

(57) ABSTRACT

A cruise control system of a vehicle comprises a target generator, a speed controller, and a distance controller. The speed controller and the distance controller are each coupled to the target generator. The target generator is configured for generating a dynamic speed target and a dynamic distance target through real-time assessment of information characterizing current operating condition characterizing information. The speed controller is configured for utilizing the dynamic speed target for issuing commands to cause the vehicle to be operated at a road speed that is adaptive to the current operating condition characterizing information. The distance controller is configured for utilizing the dynamic distance target for issuing commands to cause the vehicle to be operated such that a distance between the vehicle and a leading vehicle is adaptive to the current operating condition characterizing information.

17 Claims, 3 Drawing Sheets

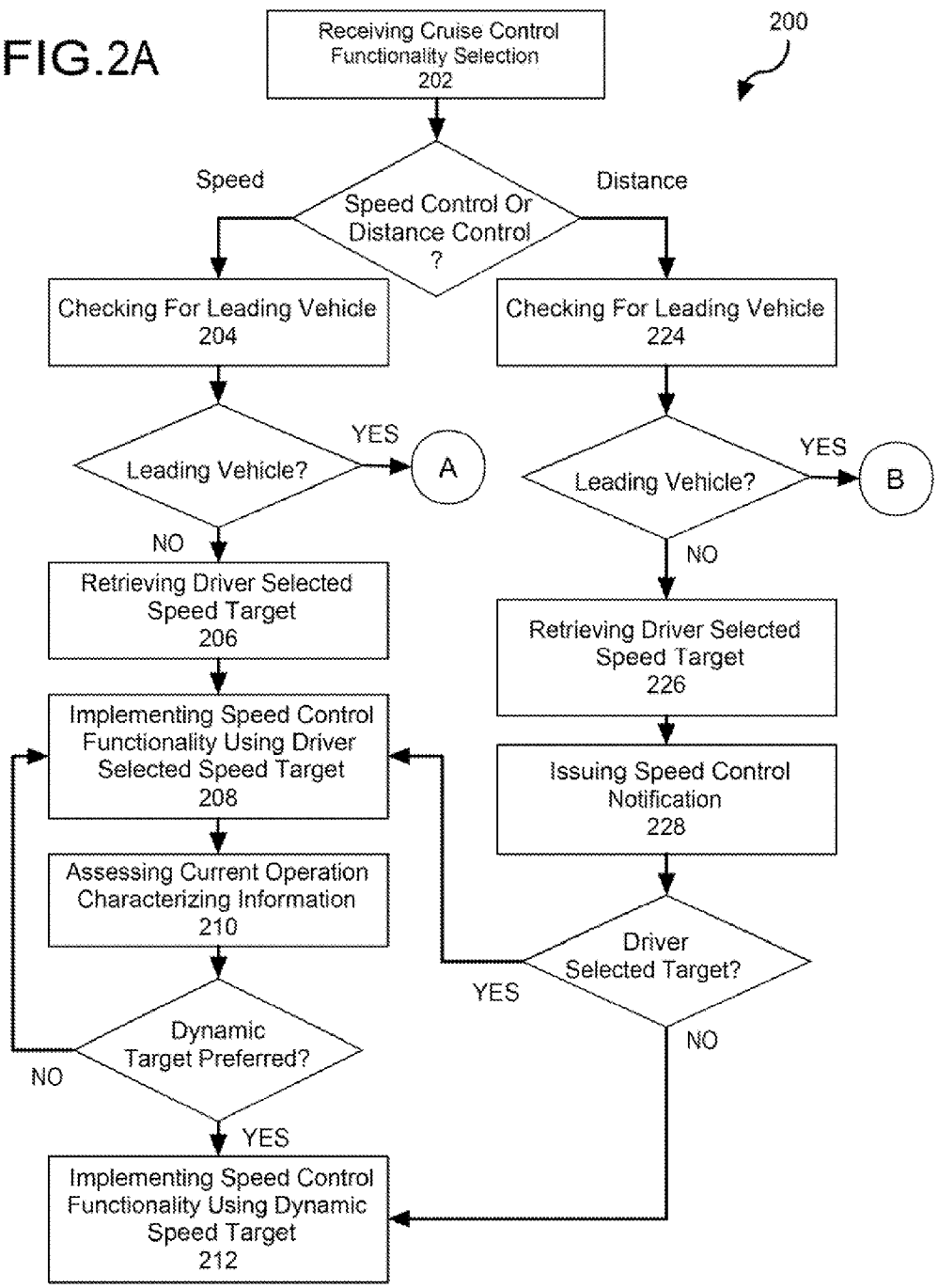

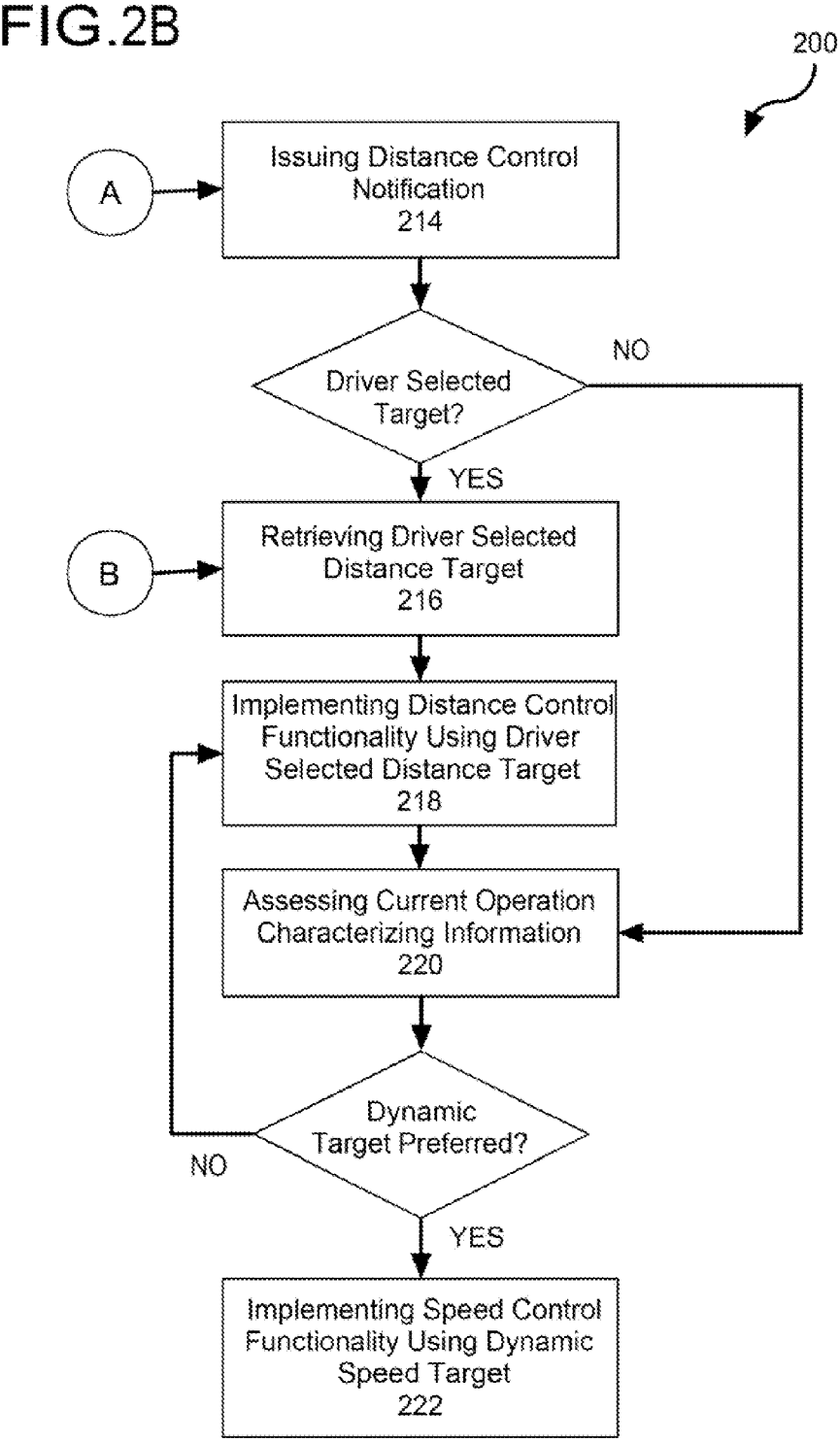

SMART ADAPTIVE CRUISE CONTROL

FIELD OF THE DISCLOSURE

The disclosures made herein relate generally to driver assist and active safety features in vehicles and, more particularly, to integration of speed control and distance control functionalities with other vehicle functionalities and systems for enhancing vehicle safety, driver assist feature capability, and driver assist feature utilization.

BACKGROUND

Cruise control (CC) has become a standard feature on most modern vehicles. It is a feature that provides the functionality of autonomously regulating a vehicle's speed around a driver-defined target speed (i.e., speed control). Although cruise, control is a feature that is standard on most vehicles, many drivers are reluctant to use it or use it in only a limited number of scenarios due to worrying about driving at a constant preset speed in various and/or varying road conditions. Examples of such road conditions include, but are not limited to, snow covered roads, icy roads, rough roads, hilly, curved, cambered roads, and the like. Furthermore, a driver's style of driving and/or behavior while driving (e.g., cautious driver, normal driver, expert driver, reckless driver, impatient driver, etc.) can influence their willingness and likeliness to use cruise control.

Adaptive Cruise Control (ACC) is an enhanced version of cruise control. Adaptive cruise control switches from a speed control mode of operation (i.e., speed control functionality) to a distance control mode of operation (i.e., distance control functionality) when the Vehicle (i.e., the follow vehicle) approaches another vehicle in front of it (i.e., the leading vehicle) that is travelling in the same direction (e.g., in the same road lane). Examples of apparatuses that can be used for sensing the leading vehicle include, but are not limited to, a radar-type sensing apparatus, a laser-type sensing apparatus, a lidar-type sensing apparatus, a camera-type sensing apparatus or the like. In response to sensing the leading vehicle and/or determining that the vehicles are within a specified distance from each other, adaptive cruise control causes the follow-vehicle to maintain a preset distance behind the leading vehicle (i.e., distance control) regardless if the leading vehicle reduces speed or brakes (e.g., the following vehicle decelerates and/or coasts until the preset distance is achieved). The preset distance can be speed-dependent such that the distance is proportional to the speed of the leading vehicle. Once the leading vehicle is passed or is otherwise no longer in front of the follow vehicle (e.g., turns off of the road or moves to a different lane), adaptive cruise control causing the follow vehicle to accelerate back to the preset cruise control speed under the speed control mode of operation. In this manner, to reduce a driver's concerns relating to maintaining constant speed while following another car, adaptive cruise control provides the functionality of changing the driver's vehicle's speed to maintain a pre-set gap (i.e., distance) between the driver's vehicle and the leading vehicle. Collision mitigation by braking (CMbB), which can be an enhancement of cruise control and active cruise control, is a safety feature that warns a driver of a leading vehicle and automatically applies brakes if there is a high risk of collision with the leading vehicle.

ACC is one example of integrating speed control with on-demand distance control. However, there are many driving situations where speed control and distance control need to be either arbitrated or switched among each other to achieve a vehicle motion state that is acceptable to the driver. For example, besides CC and ACC, modern vehicles can also be equipped with safety features such as Electronic Stability Control (ESC), Roll Stability Control (RSC), Traction Control System (TCS), Anti-lock Brake System (ABS) and/or with convenience/comfort features such as Fuel Economy Minder (FEM), Driver Advisory System, Controllable Suspension System, and Controllable Steering System. Accordingly, providing speed control used in CC device and/or distance control used in ACC device in combination with capabilities of one or more of these other safety, convenience, and/or comfort features will enhance driver assistance functionality, which can improve safety of the vehicle and, at the same time, enhance driving convenience and/or fuel economy. Furthermore, such an enhanced implementation of CC and/or ACC can potentially enhance driver's acceptance and utilization of such driver assist features.

SUMMARY OF THE DISCLOSURE

Embodiments of the inventive subject matter are directed to providing speed control used in CC device and/or distance control used in ACC device in combination with capabilities of one or more other safety, convenience, and/or comfort features of a vehicle. Such a system integrating CC and ACC functionalities with the other functionalities is referred to herein as smart adaptive cruise control (SACC). For example, SACC can leverage information and control capabilities of multiple systems (i.e., dynamic information providing systems) to provide speed and/or distance control as a function of road condition, road geometry, traffic condition, speed limit, vehicle fuel economy, driver habit/driving style, etc. As a result, embodiments of the inventive subject matter will enhance driver assistance functionality, which can improve safety of the vehicle and, at the same time, enhance driving convenience and/or fuel economy.

In one embodiment of the inventive subject matter, an electronic control system has a set of instructions tangibly embodied on a non-transitory processor-readable medium thereof. The set of instructions are accessible from the non-transitory processor-readable medium by at least one data processing device of the electronic controller system for being interpreted thereby. The set of instructions is configured for causing the at least one data processing device to carry out operations for determining a first dynamic control target in a real-time manner as a function of current operating condition characterizing information of a vehicle such that the first dynamic control target is adaptive to the current operating condition characterizing information and for controlling a cruise control system of the vehicle using the first dynamic control target.

In another embodiment of the inventive subject matter, a method for controlling a cruise control system of a vehicle includes a plurality of operations. Operations are performed for determine a dynamic speed target for the vehicle and for determining a dynamic distance target for the vehicle relative to a leading vehicle. The dynamic speed target and the dynamic distance target are each determined in a real-time manner as a function of operating condition characterizing information. An operation is performed for selectively detecting a vehicle operating condition during which a cruise control system of the vehicle is to be controlled using the dynamic speed target and a vehicle operating condition during which the cruise control system is to be controlled using the dynamic distance target. In response to detecting the vehicle operating condition during which the cruise control system of the vehicle is to be controlled using the dynamic speed target, an operation is performed for activating dynamic speed control functionality of the cruise control system. In response to detecting the vehicle operating condition during which the cruise control system of the vehicle is to be controlled using the dynamic distance target, an operation is performed for activating dynamic distance control functionality of the cruise control system.

In another embodiment of the inventive subject matter, a cruise control system of a vehicle comprises a target generator, a speed controller, and a distance controller. The target generator is configured for generating a dynamic speed target and a dynamic distance target through real-time assessment of information characterizing current operating condition. The speed controller is coupled to the target generator and is configured for utilizing the dynamic speed target for issuing commands to cause the vehicle to be operated and adapted to the current operating condition characterizing information. The distance controller is coupled to the target generator and is configured for utilizing the dynamic distance target for issuing commands to cause the vehicle to be operated such that a distance between the following and leading vehicles is adaptive to the current operating condition characterizing information.

These and other objects, embodiments, advantages and/or distinctions of the inventive subject matter will become readily apparent upon further review of the following specification, associated drawings and appended claims.

BRIEF DESCRIPTION OF THE DRAWINGS

FIGS. 2A and 2B are a flow chart showing a method for providing smart adaptive cruise control functionality in accordance with an embodiment of the inventive subject matter.

DETAILED DESCRIPTION OF THE DRAWING FIGURES

Figure 1:
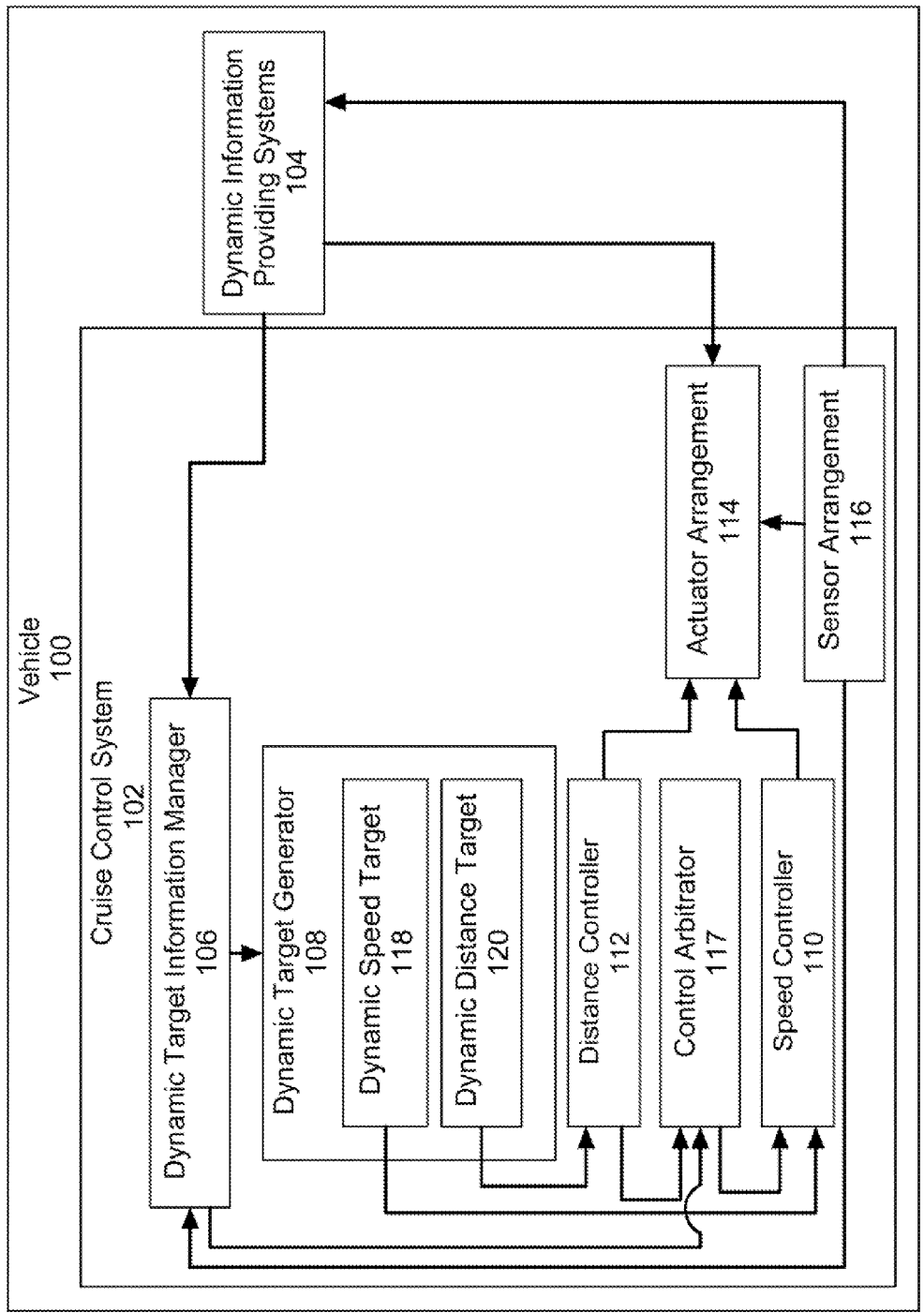
FIG. 1 is a block diagram showing a vehicle having a cruise control system configured in accordance with an embodiment of the inventive subject matter.

FIG. 1 shows a vehicle 100 having a cruise control system 102 configured in accordance with an embodiment of the inventive subject matter. More specifically, the cruise control system 100 is configured for carrying out smart adaptive cruise control functionality. Smart adaptive cruise control functionality provides for speed control used in cruise control systems and/or distance control used in adaptive cruise control systems in combination with information provided by one or more other safety, convenience, and/or comfort systems (i.e., dynamic information providing systems 104) of the vehicle 100. Smart adaptive cruise control leverages information from one or more of the dynamic information providing systems 104 to provide speed and/or distance control as a function of operating condition characterizing information that is made available from the one or more dynamic information providing systems 104. Examples of the dynamic information providing systems 104 include, but are not limited to, an electronic stability control system, a roll stability control system, a traction control system, an anti-lock brake system, a fuel economy minder system, a driver advisory system, a controllable suspension system; and a controllable steering system. By integrating cruise control functionality with operating condition characterizing information provided by one or more dynamic information providing systems, the inventive subject matter (i.e., smart adaptive cruise control) provides for enhances driver assistance functionality, which can improve safety of the vehicle and, at the same time, enhance driving convenience and/or fuel economy.

The cruise control system 102 includes a dynamic target information manager 106, a dynamic target generator 108, a speed controller 110, a distance controller 112, an actuator arrangement 114, a sensor arrangement 116, and a control arbitrator 117. The dynamic target information manager 106, which is coupled between the dynamic target generator 108 and the dynamic information providing systems 104, can receive, process, and store current operating condition characterizing information received from one or more dynamic information providing systems 104. The dynamic target information manager 106 is coupled to the dynamic target generator 108 for providing the dynamic target generator 108 with information upon which a dynamic speed target 118 and the dynamic distance target 120 can be generated. The dynamic target generator 108 generates the dynamic speed target 118 and the dynamic distance target 120 through real-time assessment of the current operating condition characterizing information provided thereto by the dynamic target information manager 106. The control arbitrator is coupled between the speed controller 110 and the distance controller 112 for providing arbitration functionality in regard to the vehicle being controlled in accordance with speed control functionality and distance control functionality.

The speed controller 110, which is coupled between the dynamic target generator 108 and the actuator arrangement 114, utilizes the dynamic speed target 118 for issuing commands to the actuator arrangement 114 to cause the vehicle 100 to be operated at a speed that is adaptive to the current operating condition characterizing information (i.e., one embodiment of speed control functionality). The speed controller 110 and a portion of the dynamic target generator 168 that generates the dynamic speed target 118 jointly define a dynamic speed target module, which can include at least one data processing device, memory and instructions jointly configured for carrying out speed control functionality. In one embodiment, the speed controller 110 can command one or more actuators (e.g., braking, throttling, and/or transmission shift actuators) to regulate error between vehicle speed and the dynamic speed target 118 such that the vehicle speed stays close to the dynamic speed target 118 within an error band. Furthermore, in association with issuing such commands, the speed controller 110 can utilize the dynamic speed target 118 for comparing a driver specified speed target to the dynamic speed target 118 for determining a preferred speed target and transitioning the cruise control system 102 from issuing the commands as a function of the driver specified speed target to issuing commands as a function of the dynamic speed target 118 in response to determining that the dynamic speed target 118 is the preferred speed target.

The distance controller 112, which is coupled between the dynamic target generator 108 and the actuator arrangement 114 utilizes the dynamic distance target 120 for issuing commands to the actuator arrangement 114 to cause the vehicle 100 to be operated such that a distance between the vehicle 100 and a leading vehicle (e.g., another vehicle ahead of the vehicle 100 in the same lane) is adaptive to the current operating condition characterizing information ((i.e., one embodiment of distance control functionality). The distance controller 112 and a portion of the dynamic target generator 108 that generates the dynamic distance target 120 jointly define a dynamic speed target module, which can include at least one data processing device, memory and instructions jointly configured for carrying out distance control functionality. In one embodiment, the distance controller 112 can command one or more actuators (e.g., braking, throttling, and/or transmission shift actuators) to regulate error between a relative distance of the vehicle 100 and the leading vehicle and the dynamic distance target 120 such that the vehicle 100 stays close to the dynamic distance target 120 within a distance error band. Furthermore, in association with issuing such commands, the distance controller 112 can utilize the dynamic distance target 120 for comparing a driver specified distance target to the dynamic distance target 120 for determining a preferred distance target and transitioning the cruise control system 102 from issuing the commands as a function of the driver specified distance target to issuing commands as a function of the dynamic distance target 120 in response to determining that the dynamic distance target 120 is the preferred distance target.

The control arbitrator 117 can provide for control arbitration functionality between speed control functionality and distance control functionality. This control arbitration functionality can be performed as a function of information generated by one or more of the dynamic information providing systems 104 (e.g., via the dynamic target information manager 106) and/or information generated by the dynamic target information manager 106. One example of control arbitration functionality includes quitting speed control functionality mode or distance control functionality during dangerous driving conditions and/or activation of a system that provides dynamic control of steering (e.g., via controllable steering system), braking (e.g., via anti-lock braking system), traction (e.g., via traction control system), suspension (e.g., via controllable suspension system), handling (e.g., via roll stability control system), crash (e.g., via crash mitigation system and/or crash warning system), and/or engine output (e.g., via powertrain control system). Another example of control arbitration functionality includes quitting distance control functionality during high risk of collision such as indicated by a crash mitigation system and/or crash warning system. In view of the disclosures made herein, a skilled person will contemplate other implementations of control arbitration functionality.

The sensor arrangement 116 provides feedback information to the actuator arrangement 114, the dynamic target information manager 106, and/or the dynamic information providing systems 104. Examples of the feedback information include, but are not limited to, a current actuator setting, an operating parameter resulting from a commanded actuator action, an indication of an operating parameter threshold being met, an indication of an actuator setting limit being met, and the like. A skilled person will appreciate that the actuator arrangement 114 can include one or more actuators and that the sensor arrangement 116 can include one or more sensors. Furthermore, a skilled person will appreciate that the actuator arrangement 114 and the sensor arrangement 116 can include components of one or more of the dynamic information providing systems 104 but which are utilized by the cruise control system during cruise control operation (i.e., component(s) that provide shared use by a plurality of systems of the vehicle 100).

Examples of the information upon which the dynamic speed target 118 and the dynamic distance target 120 can be generated include, but are not limited to, information characterizing a road surface condition (e.g., friction level, texture, grade, banking, etc) of a road over which the vehicle is travelling, a geometry of a road over which the vehicle is travelling (e.g., as indicated by a electronic horizon, LIDAR system, RADAR system, vision system, etc), ambient climate conditions at a current geographical position of the vehicle, driving behavior of a current driver of the vehicle (e.g., cautious, normal, expert, reckless, novice, aged, etc), a type of operational priority (e.g., fuel economy, ride comfort, performance, safety, etc), a type of the road over which the vehicle is travelling (e.g., rural, interstate, urban, etc.), collision mitigation (e.g., as indicated by lane departure information, crash avoidance information, etc), and fuel economy requirements. In one embodiment, the dynamic speed target 118 and/or the dynamic distance target 120 can be continuously determined as a function of (e.g., as defined by a envelope containing variable thresholds for) a driver preset speed target, a maximum speed allowed by the real-time road surface condition for a road over which the vehicle is travelling, a maximum speed allowed by the real-time road geometry condition, a maximum speed allowed by available info of the road (e.g., recorded from previous trip, from GPS database, etc), official speed limit of the road, the maximum speed which is compatible with the real-time driving behavior of the vehicle, and the optimal speed determined by fuel economy requirements. In another embodiment, the dynamic-speed target 118 and/or the dynamic distance target 120 can be continuously determined as a function of (e.g., as defined by a envelope containing variable thresholds for) vehicle speed, road surface condition, traction influencing considerations (e.g., snow, rain, sleet, etc adversely impacting available traction), road grade, type of road (e.g., local, interstate, rural, etc), driving behavior (e.g., cautious, normal, expert, reckless, etc.), and fuel economy requirements. In this regard, the dynamic speed target 118 and the dynamic distance target 120 are each adaptive in real-time to the operating condition characterizing information of the vehicle 100 such that the vehicle 100 can be driven with safety, comfort, or efficiency that is compatible with current operating conditions/information.

The information upon which the dynamic speed target 118 and the dynamic distance target 120 can be generated is provided by one or more of the dynamic information providing systems 104. Examples of the dynamic information providing systems 104 include but are not limited to, a road and/or sign imaging system (e.g., using vision, RADAR, and/or LIDAR technologies), a traction control system, a stability control system, a brake control system, a global positioning system, a hazardous driving condition warning system, a speed limit warning system, a curve over speed warning system, a lane departure warning system, a collision mitigation system, and a fuel economy managing system. In view of the disclosures made herein, a skilled person will appreciate that the inventive subject matter is not unnecessarily limited to any particular information upon which a dynamic speed target and a dynamic distance target can be generated or dynamic information providing system from which such information can be provided.

Referring now to FIGS. 2A and 2B, a method 200 for providing smart adaptive cruise control functionality in accordance with an embodiment of the inventive subject matter is shown. In one embodiment, the method 200 can be performed by the cruise control system 102 of FIG. 1. However, in view of the disclosures made herein a skilled person will appreciate that methods and associated instruction sets configured in accordance with embodiments of the inventive subject matter are not unnecessarily limited to being implemented through use of any particular hardware, firmware, software, algorithmic, and/or electronic control system.

The method 100 begins with an operation 202 for receiving a selected cruise control mode (i.e., distance control functionality or speed control functionality) from a driver of a vehicle. The selection can be made using a means such as, for example, a human machine interface that is in the form of physical control elements (e.g., a knob, a switch, a lover, etc) and/or in the form of a selectable displayed control element (e.g., a button on a touch screen). The inventive subject matter is not limited to any particular means of allowing a driver to select a cruise control mode.

In response to speed control functionality being selected, an operation 204 is performed for checking for a leading vehicle such as using a vision system and/or RADAR system. In one embodiment, a leading vehicle is a vehicle that is determined to be in front of and within the same lane as the vehicle for which the method 100 is being performed. If there is no leading vehicle, an operation 206 is performed for retrieving a driver selected speed target (i.e., non-dynamic speed target) such as front memory of the cruise control system and then an operation 208 is performed for implementing speed control functionality using the driver selected speed target. While such speed control functionality is being carried out, an operation 210 is performed for assessing current operating characterization information for determining if a dynamic speed target is preferred as compared to the driver selected speed target. If it is determined that the current operating characterization information indicate that the dynamic speed target is preferred as compared to the driver selected speed target, an operation 212 is performed for implementing speed control functionality using the dynamic speed target. Otherwise, if it is determined that the current operating characterization information indicate that the driver selected speed target is preferred as compared to the dynamic speed target, the method 100 continues with implementing speed control functionality using the driver selected speed target. It is disclosed herein that the operation of assessing current operating characterization information for determining if the dynamic speed target is preferred as compared to the driver selected speed target can be performed prior the operation 208 for implementing speed control functionality using the dynamic speed target (e.g., immediately before or immediately after the operation 206) such that, if it is determined that the dynamic speed target is preferred as compared to the driver selected speed target, the speed control functionality is initially implemented using the dynamic speed target. Furthermore, it is disclosed herein that a manufacturer specified non-dynamic speed target can be used in place of the driver selected speed target.

If, at the operation 204 for checking for a leading vehicle, it is determined that there is a leading vehicle (e.g., within the same lane as the vehicle of the method 200 within a prescribed distance), the method continues at an operation 214 (FIG. 2B) for issuing a distance control notification. The distance control notification provides the driver with an ability to indicate that the distance control functionality should be implemented using a driver selected distance target (i.e., a non-dynamic distance target). If, in response to issuing the distance control notification, a response is received indicating that the driver has selected distance control functionality using the driver selected distance target, an operation 216 is performed for retrieving the driver selected distance target (i.e., non-dynamic distance target) such as from memory of the cruise control system and then an operation 218 is performed for implementing distance control functionality using the driver selected distance target. While such distance control functionality is being carried out, an operation 220 is performed for assessing current operating characterization information for determining if a dynamic distance target is preferred as compared to the driver selected distance target. If it is determined that the current operating characterization information indicate that the dynamic distance target is preferred as compared to the driver selected distance target, an operation 222 is performed for implementing speed control functionality using the dynamic distance target. Otherwise, if it is determined that the current operating characterization information indicate that the driver selected distance target is preferred as compared to the dynamic distance target, the method 100 continues with implementing distance control functionality using the driver selected distance target. It is disclosed herein that the operation of assessing current operating characterization information for determining if the dynamic distance target is preferred as compared to the driver selected distance target can be performed prior the operation 218 for implementing distance control functionality using the dynamic distance target (e.g., immediately before or immediately after the operation 216) such that, if it is determined that the dynamic distance target is preferred as compared to the driver selected distance target, the distance control functionality is initially implemented using the dynamic distance target. Furthermore, it is disclosed herein that a manufacturer specified non-dynamic distance target can be used in place of the driver selected distance target.

Referring back to FIG. 2A, if distance control functionality is selected in response to the operation 202 being performed for receiving the selected cruise control mode (i.e., distance control functionality or speed control functionality), an operation 224 is performed for checking for a leading vehicle. If there is not a leading vehicle, the method 100 continues at the operation 216 for retrieving the driver selected target and then proceeds accordingly with the operations that follow. If there is no leading vehicle, an operation 226 is performed for retrieving the driver selected speed target followed by an operation 228 being performed for issuing a speed control notification. The speed control notification provides the driver with an ability to indicate that the speed control 330 functionality should be implemented using the driver selected speed target. If, in response to issuing the speed control notification, a response is received indicating that the driver has selected speed control functionality using the driver selected speed target, the method 100 continues at the operation 206 for implementing speed control functionality using the driver selected speed target. Otherwise, the method continues at the operation 212 for implementing speed control functionality using the dynamic speed target.

Referring now to instructions processable by a data processing device, it will be understood from the disclosures made herein that methods, processes and/or operations adapted for carrying out smart adaptive cruise control functionality as disclosed herein are tangibly embodied by non-transitory-computer readable medium having instructions thereon that are configured for carrying out such functionality. In one embodiment, the instructions can be tangibly embodied for carrying out the method 200 disclosed and discussed above. The instructions can be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive subject matter include a compact disk, a hard drive, RAM or other type of storage apparatus that has imaged thereon a computer program (i.e., instructions) configured for carrying out smart adaptive cruise control functionality in accordance with the inventive subject matter.

In an embodiment of the inventive subject matter, a control module of an electronic control system configured for providing smart adaptive cruise control (SACC) functionality (i.e., a SACC control module) includes a data processing device, a non-transitory computer readable medium, and instructions on the computer readable medium for carrying out smart adaptive cruise control functionality (e.g., in accordance with the method 200 discussed above in reference to FIG. 2). The SACC control module can include various signal interfaces for receiving and outputting signals. A smart adaptive cruise control module in the context of the inventive subject matter can be any control module of an electronic control system that provides for trailer back-up assist control functionality in accordance with the inventive subject matter. Furthermore, it is disclosed herein that such a control functionality can be implemented within a standalone control module (physically and logically) or can be implemented logically within two or more separate but interconnected control modules (e.g., of an electronic control system of a vehicle). In one example, a SACC control module in accordance with the inventive subject matter is implemented within a standalone controller unit that provides only smart adaptive cruise control functionality. In another example, smart adaptive cruise control functionality in accordance with the inventive subject matter is implemented within a standalone controller unit of an electronic control system of a vehicle that provides smart adaptive cruise control functionality as well as one or more other types of system control functionality of a vehicle. In still another example, smart adaptive cruise control functionality in accordance with the inventive subject matter is implemented logically in a distributed manner whereby a plurality of control units, control modules, computers, or the like (e.g., an electronic control system) jointly carry out operations for providing such smart adaptive cruise control functionality.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for controlling a cruise control system of a vehicle, the method carried out by an electronic control system on the vehicle, the electronic control system associated with the cruise control system and having a set of instructions readable by at least one data processing device configured to carry out instructions for controlling the cruise control system, the method comprising the steps of:

assessing information, received by the electronic control system, representative of road surface conditions of a road over which the vehicle is travelling, ambient climate conditions at a current geographical position of the vehicle, a driving style of a current driver of the vehicle, the driving style being identified in real time while the current driver is driving, as cautious, normal, expert, reckless, or impatient, a geometry of a road over which the vehicle is travelling, a type of road over which the vehicle is travelling, and fuel economy requirements of the vehicle to define current operation condition characterizing information of the vehicle;

determining a first dynamic control target in a real-time manner as a function of current operating condition characterizing information of the vehicle such that the first dynamic control target is adaptive to the current operating condition characterizing information; and controlling the cruise control system of the vehicle as a function of the first dynamic control target.

2. The method of claim 1 wherein determining the first dynamic control target includes assessing information provided by at least one of a traction control system of the vehicle, a stability control system of the vehicle, a brake control system of the vehicle, a global positioning system of the vehicle, and a fuel economy managing system of the vehicle.

3. The method of claim 1 wherein controlling the cruise control system further comprises the steps of:

comparing a driver specified cruise control target to the first dynamic control target for determining a preferred cruise control target; and transitioning the cruise control system from issuing commands as a function of the driver specified cruise control target to issuing commands as a function of the first dynamic control target in response to determining that the first dynamic control target is the preferred cruise control target.

4. The method of claim 3 wherein determining the dynamic control target includes assessing information provided by at least one of a traction controlling system of the vehicle, a stability control system of the vehicle, a brake control system of the vehicle, a global positioning system of the vehicle, and a fuel economy managing system of the vehicle.

5. The method of claim 1 wherein controlling the cruise control system further comprises the steps of:

issuing commands for causing the vehicle to be operated at a road speed that is adaptive to the current operating condition characterizing information;

issuing commands for causing the vehicle to be operated such that a distance between the vehicle and a leading vehicle is adaptive to the current operating condition characterizing information; and arbitrating between commands issued for speed control functionality and commands issued for distance control functionality.

6. The method of claim 5 wherein determining the dynamic control target includes assessing information provided by at least one of a traction control system of the vehicle, a stability control system of the vehicle, a brake control system of the vehicle, a global positioning system of the vehicle, and a fuel economy managing system of the vehicle.

7. The method of claim 1 further comprising the steps of:

determining a second dynamic control target in a real-time manner as a function of the current operating condition characterizing information such that the second dynamic control target is adaptive to the current operating condition characterizing information;

controlling the cruise control system of the vehicle using the second dynamic control target; and determining a first type of vehicle operating condition during which the cruise control system is to be controlled using the first dynamic control target and a second type of vehicle operating condition during which the cruise control system is to be controlled using the second dynamic control target.

8. The method of claim 7 wherein:
the first dynamic control target is a dynamic speed target;
the second dynamic control target is a dynamic distance target; and
controlling the cruise control system using the dynamic speed target further comprises operating the vehicle at a road speed that is adaptive to the current operating condition characterizing information; and
controlling the cruise control system using the dynamic distance target operating the vehicle such that a distance between the vehicle and a leading vehicle is adaptive to the current operating condition characterizing information.

9. The method of claim 8 wherein determining the dynamic control target includes assessing information provided by at least one of a traction control system of the vehicle, a stability control system of the vehicle, a brake control system of the vehicle, a global positioning system of the vehicle, and a fuel economy managing system of the vehicle.

10. An electronic control system having a set of instructions configured to carry out operations for:
at least one data processing device accessing, from memory coupled to the at least one data processing device, instructions causing the at least one data processing device to assess information characterizing a road surface condition of a road over which the vehicle is travelling, ambient climate conditions at a current geographical position of the vehicle, a driving style of a current driver of the vehicle identified in real time while the current driver is driving as cautious, normal, expert, reckless, or impatient, a geometry of a road over which the vehicle is travelling, a type of road over which the vehicle is travelling, and fuel economy requirements of the vehicle;
the at least one data processing device accessing, from memory coupled to the at least one data processing device, instructions causing the at least one data processing device to determine a dynamic speed target for the vehicle, wherein the dynamic speed target is determined in a real-time manner as a function of current operating condition characterizing information;
the at least one data processing device accessing, from the memory, instructions causing the at least one data processing device to determine a dynamic distance target for the vehicle relative to a leading vehicle that the vehicle is following, wherein the dynamic distance target is determined in a real-time manner as a function of current operating condition characterizing information;
the at least one data processing device accessing from memory, instruction causing the at least one data processing device to asses information characterizing at least one of a road surface condition of a road over which the vehicle is travelling, ambient climate conditions at a current geographical position of the vehicle, a driving style of a current driver of the vehicle, a geometry of a road over which the vehicle is travelling, a type of road over which the vehicle is travelling, and fuel economy requirements of the vehicle;
the at least one data processing device accessing, from the memory, instructions causing the at least one data processing device to selectively detect a vehicle operating condition during which a cruise control system of the vehicle is to be controlled using the dynamic speed target and a vehicle operating condition during which the cruise control system is to be controlled using the dynamic distance target; and
the at least one data processing device accessing, from the memory, instructions causing the at least one data processing device to activate dynamic speed control functionality of the cruise control system in response to detecting the vehicle operating condition during which the cruise control system of the vehicle is to be controlled using the dynamic speed target and to activate dynamic distance control functionality of the cruise control system in response to detecting the vehicle operating condition during which the cruise control system of the vehicle is to be controlled using the dynamic distance target.

11. The system of claim 10 wherein at least one of instructions causing the at least one data processing device to determine the dynamic speed target and instructions causing the at least one data processing device to determine the dynamic distance target includes instructions causing the at least one data processing device to assess information provided by at least one of a traction control system of the vehicle, a stability control system of the vehicle, a brake control system of the vehicle, a global positioning system of the vehicle, and a fuel economy managing system of the vehicle.

12. The system of claim 10 wherein:
the dynamic speed control functionality includes instructions comparing a driver specified speed target to the dynamic speed target to determine a preferred speed target and instructions to transition the cruise control system from issuing commands as a function of the driver specified speed target to issuing commands as a function of the dynamic speed target in response to determining that the dynamic speed target is the preferred speed target; and
the dynamic distance control functionality includes instructions comparing a driver specified distance target to the dynamic distance target to determine a preferred distance target and instructions to transition the cruise control system from issuing commands as a function of the driver specified distance target to issuing commands as a function of the dynamic distance target in response to determining that the dynamic distance target is the preferred distance target.

13. The system of claim 10 wherein:
the dynamic speed control functionality includes issuing commands causing the vehicle to be operated at a road speed that is adaptive to the current operating condition characterizing information; and
the dynamic distance control functionality includes issuing commands causing the vehicle to be operated such that a distance between the vehicle and a leading vehicle is adaptive to the current operating condition characterizing information.

14. A cruise control system of a vehicle, comprising:
a target generator generating a dynamic speed target and a dynamic distance target through real-time assessment of information characterizing current operating condition of a road surface condition of a road over which the vehicle is travelling, ambient climate conditions at a current geographical position of the vehicle, a driving style of a current driver of the vehicle identified in real time while the current driver is driving as cautious, normal, expert, reckless, or impatient, a type of road over which the vehicle is travelling, and fuel economy requirements of a vehicle;
a speed controller coupled to the target generator, wherein the speed controller utilizes the dynamic speed target to issue commands to cause the vehicle to be operated at a road speed that is adaptive to the current operating condition characterizing information; and a distance controller coupled to the target generator, wherein the distance controller utilizes the dynamic distance target to issue commands to cause the vehicle to be operated such that a distance between the vehicle and a leading vehicle is adaptive to the current operating condition characterizing information.

15. The cruise control system of claim 14 wherein the information characterizing the current operating condition characterizing information includes information provided by at least one of a traction control system of the vehicle, a stability control system of the vehicle, a brake control system of the vehicle, a global positioning system of the vehicle, and a fuel economy managing system of the vehicle.

16. The cruise control system of claim 14 wherein:

utilizing the dynamic speed target to issue commands to cause the vehicle to be operated at a road speed that is adaptive to the current operating condition characterizing information includes comparing a driver specified speed target to the dynamic speed target to determine a preferred speed target and transitioning the cruise control system from issuing commands as a function of the driver specified speed target to issuing commands as a function of the dynamic speed target in response to determining that the dynamic speed target is the preferred speed target; and utilizing the dynamic distance target to cause the vehicle to be operated at a road speed that is adaptive to the current operating condition characterizing information includes comparing a driver specified distance target to the dynamic distance target for determining a preferred distance target and transitioning the cruise control system from issuing commands as a function of the driver specified distance target to issuing commands as a function of the dynamic distance target in response to determining that the dynamic distance target is the preferred distance target.

17. The cruise control system of claim 16 wherein the information characterizing the current operating condition characterizing information includes information provided by at least one of a traction control system of the vehicle, a stability control system of the vehicle, a brake control system of the vehicle, a global positioning system of the vehicle, and a fuel economy managing system of the vehicle.

* * * * *